(12) United States Patent
Kawakami

(10) Patent No.: US 7,160,019 B1
(45) Date of Patent: Jan. 9, 2007

(54) SIDE-LIGHTING TYPE SURFACE LIGHT SOURCE DEVICE, METHOD FOR MANUFACTURING THE SAME, ELECTROOPTICAL APPARATUS, AND ELECTRONIC EQUIPMENT

(75) Inventor: Hisanori Kawakami, Matsumoto (JP)

(73) Assignee: Seiko Epson Corporation (JP)

( * ) Notice: Subject to any disclaimer, the term of this patent is extended or adjusted under 35 U.S.C. 154(b) by 1330 days.

(21) Appl. No.: 09/635,891

(22) Filed: Aug. 10, 2000

(30) Foreign Application Priority Data

Aug. 11, 1999 (JP) .................................. 11-227272

(51) Int. Cl.
*F21V 7/04* (2006.01)

(52) U.S. Cl. ........................ 362/632; 362/609; 362/634

(58) Field of Classification Search ................ 362/632, 362/633, 634, 609, 561; 349/58, 65, 67, 349/62, 70
See application file for complete search history.

(56) References Cited

U.S. PATENT DOCUMENTS

| | | | | |
|---|---|---|---|---|
| 5,788,356 A | * | 8/1998 | Watai et al. ................. | 362/621 |
| 5,831,697 A | * | 11/1998 | Evanicky et al. ............. | 349/62 |
| 6,295,105 B1 | * | 9/2001 | Lee et al. .................... | 349/65 |
| 2003/0218702 A1 | * | 11/2003 | Kwon et al. .................. | 349/65 |

FOREIGN PATENT DOCUMENTS

| | | |
|---|---|---|
| EP | 0 607 453 A1 | 1/1994 |
| EP | 0 636 918 A1 | 2/1995 |
| EP | 0 798 507 A1 | 10/1997 |
| JP | 3-91614 | 9/1991 |
| JP | 8-335048 | 12/1996 |
| JP | 9-251111 | 9/1997 |
| JP | 10-177171 | 6/1998 |
| JP | 11-272191 | 10/1999 |

OTHER PUBLICATIONS

Communication from Japanese Patent Office regarding counterpart application.

* cited by examiner

*Primary Examiner*—Sandra O'Shea
*Assistant Examiner*—Guiyoung Lee
(74) *Attorney, Agent, or Firm*—Harness, Dickey & Pierce, P.L.C.

(57) ABSTRACT

A side-lighting type surface light source device 100 includes a light source 40, a reflector member 50, a light guide plate member 30, and a fixing member 10. The reflector member 50 reflects a light ray from the light source, and includes opposed first end portion 520c and second end portion 520a, wherein the first end portion is arranged to project out of the second end portion. The fixing member 10 includes a fixing body 12 having a support surface (a back portion 12a) and a reflector holder 14 for holding the reflector member. The reflector member supports the reflective sheet 20 and the light guide plate member 30 with the first end portion thereof.

17 Claims, 9 Drawing Sheets

(A)

(B)

(C)

(A)

(B)

(A)

(B)

(C)

SIDE-LIGHTING TYPE SURFACE LIGHT SOURCE DEVICE, METHOD FOR MANUFACTURING THE SAME, ELECTROOPTICAL APPARATUS, AND ELECTRONIC EQUIPMENT

BACKGROUND OF THE INVENTION

1. Field of the Invention

The present invention relates to a side-lighting type surface light source device, a method for manufacturing the side-light type surface light source device, an electrooptical apparatus incorporating the side-light type surface light source device, and electronic equipment incorporating the electrooptical apparatus.

2. Description of the Related Art and Problems to be Solved by the Invention

FIG. 11 shows one example of a side-lighting type surface light source device employed in a liquid-crystal display device. A reflective sheet 4 is arranged on the underside of a light guide plate 3 in the side-lighting type surface light source shown in FIG. 11. A line light source 1 is arranged on an end surface 3a of the light guide plate 3. A reflector 2 is mounted to direct most of light rays from the light source 1 toward the end surface 3a of the light guide plate 3. The reflector 2 is formed, surrounding the light source 1 except the end surface 3a of the light guide plate 3, and thereby reflecting the light rays from the light source 1 toward the end surface 3a. The reflector 2 has opposed first end portion 2a and second end portion 2b, and the two end portions 2a and 2b are respectively overlaid on the front side and the back side of the light guide plate 3. The end portions 2a and 2b of the reflector 2 are respectively fixed to the front side of the light guide plate 3 and the back side of the reflective sheet 4 using both-side adhesive tapes 5a and 5b.

Since the top and the bottom of the end portion including the end surface 3a of the light guide plate 3 are covered with the end portions 2a and 2b of the reflector 2 in the side-lighting type surface light source device having the above construction, the light rays from the light source 1 are prevented from straying from regions other than the end surface 3a of the light guide plate 3, and the light rays are effectively utilized. The side-lighting type surface light source device basically having such a coupling structure is disclosed in Japanese Unexamined Patent Application Publication No. 9-211450.

In the structure that affixes the light guide plate 3 to the reflector 2 using the both-side adhesive tapes 5a and 5b, a dedicated tool must be used with the components to be assembled (the light guide plate, the reflector, and the reflective sheet) aligned with the both-side adhesive tapes in an assembly process. The assembly process thus needs much attention and skill, and a number of assembly steps, and the assembly process itself is not so easy, requiring high costs.

The side-lighting type surface light source device having the above structure needs space for accommodating the both-side tapes 5a and 5b, respectively between the reflector 2 and the light guide plate 3, and between the reflector 2 and the reflective sheet 4, and the thickness of the device is accordingly increased. This presents a difficulty in an effort to promote a thinner design, although the demand for a thinner design is currently mounting in devices.

It is an object of the present invention to provide a side-lighting type surface light source device which is easy to assemble, has a small number of assembly steps, and is thin in the overall thickness thereof, and to provide a method for manufacturing the side-lighting type surface light source device. It is a further object of the present invention to provide an electrooptical apparatus and electronic equipment, each incorporating such a side-lighting type surface light source device.

SUMMARY OF THE INVENTION

A side-lighting type surface light source device of the present invention includes a light source, a reflector member, a light guide plate member, and a fixing member, wherein the reflector member, for reflecting a light ray from the light source, includes opposed first and second end portions with the first end portion projecting out of the second end portion, the light guide plate member is arranged in a position that allows the light ray from the light source to enter through the end thereof, and has a light exiting surface that allows the incident light ray to exit in a directivity, the fixing member includes a fixing body having a support surface and a reflector holder for holding the reflector member, and the reflector member directly or indirectly supports at least the light guide plate member on the first end portion thereof.

In the side-lighting type surface light source device, the reflector member directly or indirectly fixes at least the light guide plate member on the first end portion thereof. Unlike the conventional art, this arrangement eliminates the need for the both-side adhesive tape for fixing the light guide plate member to the reflector member, and thus provides a side-lighting type surface light source device having a thin thickness compared to the conventional art.

The side-lighting type surface light source device of the present invention is preferably embodied in the following modes.

(A) The light guide plate member is preferably secured by the support surface of the fixing member and the first end portion of the reflector member. With this arrangement, the light guide plate member is supported by a minimum of members.

(B) The fixing member preferably includes a fixing body formed of a planar member, a reflector holder integrally formed with the fixing body, and a lug portion that projects out of the reflector holder. With this arrangement, a compact device results, with the reflector holder integrally formed with the fixing body.

(C) The reflector member is preferably secured in a clamped state between the reflector holder and the lug portion of the fixing member. With this arrangement, the reflector member is secured in a simple structure using a minimum of members.

(D) At least the light guide plate member is preferably secured in a clamped state between the fixing body of the fixing member and the first end portion of the reflector member. With this arrangement, the light guide plate member is secured in a simple structure using a minimum of members.

(E) One member is preferably secured along with the light guide plate member in a clamped state between the fixing body of the fixing member and the first end portion of the reflector member.

The one member may be a reflective sheet arranged on the surface of the light guide plate member opposite to the light exiting surface thereof or may be an optical sheet arranged above the light exiting surface of the light guide plate member, depending on the electrooptical apparatus to which the present invention is applied. The optical sheet is at least one selected from a prism sheet, a diffusion sheet, and a reflective-type polarizer film.

A side-lighting type surface light source device of the present invention may be manufactured in accordance with the following manufacturing methods, for example.

A method for manufacturing a side-lighting surface light source device, including a light source, a reflector member, for reflecting a light ray from the light source, including opposed first and second end portions, a light guide plate member, and a fixing member including a fixing body having a support surface and a reflector holder for holding the reflector member, includes the following steps (a) and (b).

The step (a) of arranging members, at least including the light guide plate member, at a predetermined position on the support surface of the fixing member, and the step (b) of mounting the reflector member, having the light source installed therewithin, at a predetermined position in the reflector holder of the fixing member, wherein the reflector member is arranged so that the first end portion thereof is farther apart from the support surface of the fixing member than the second end portion thereof.

The manufacturing method has the following operation and advantages.

(1) At least the light guide plate member is fixed by the support surface of the fixing member and the first end portion of the reflector member. Furthermore, the reflector member is held by the reflector holder of the fixing member. At least the light guide plate member is fixed by the reflector member and the fixing member.

In accordance with the present invention, the light guide plate member is fixed without using adhesive means, such as both-side adhesive tape. The present invention thus improves a working efficiency problem arising from the use of the both-side adhesive, and reduces the number of processing steps, and substantially reduces costs involved.

(2) The reflector member is positioned at a predetermined location with a simple process of inserting the reflector member into the reflector holder. The reflector is thus assembled without the need for high alignment accuracy and precise bonding technique, and thus simplifies the assembly process.

A fixing member preferably includes a fixing body formed of a planar member, a reflector holder integrally formed with the fixing body, and a lug portion that projects out of the reflector holder. With this arrangement, the reflector member is reliably fixed through a simple method of bending the lug portion. Even if the positioning of the reflector member is not successful, a rework is easily performed by straightening the lug portion again.

An electrooptical apparatus of the present invention includes a side-lighting type surface light source device of the present invention. An electrooptical display unit is preferably arranged at least on the light emitting surface side of the light guide plate member of the side-lighting type surface light source device. These electrooptical apparatuses include a thin side-lighting type surface light source device, thereby implementing a compact and thin design.

Electronic equipment of the present invention includes an electrooptical apparatus of the present invention. The electronic equipment includes a thin side-lighting type surface light source device of the present invention, thereby implementing a compact and thin design.

BRIEF DESCRIPTION OF THE DRAWINGS

FIGS. 10(A), 10(B), and 10(C) are external views of electronic equipment that incorporates the liquid-crystal display unit of the present invention, wherein FIG. 10(A) shows a portable telephone, FIG. 10(B) shows a wristwatch, and FIG. 10(C) shows portable information equipment.

DETAILED DESCRIPTION OF THE PREFERRED EMBODIMENTS

Figure 1:
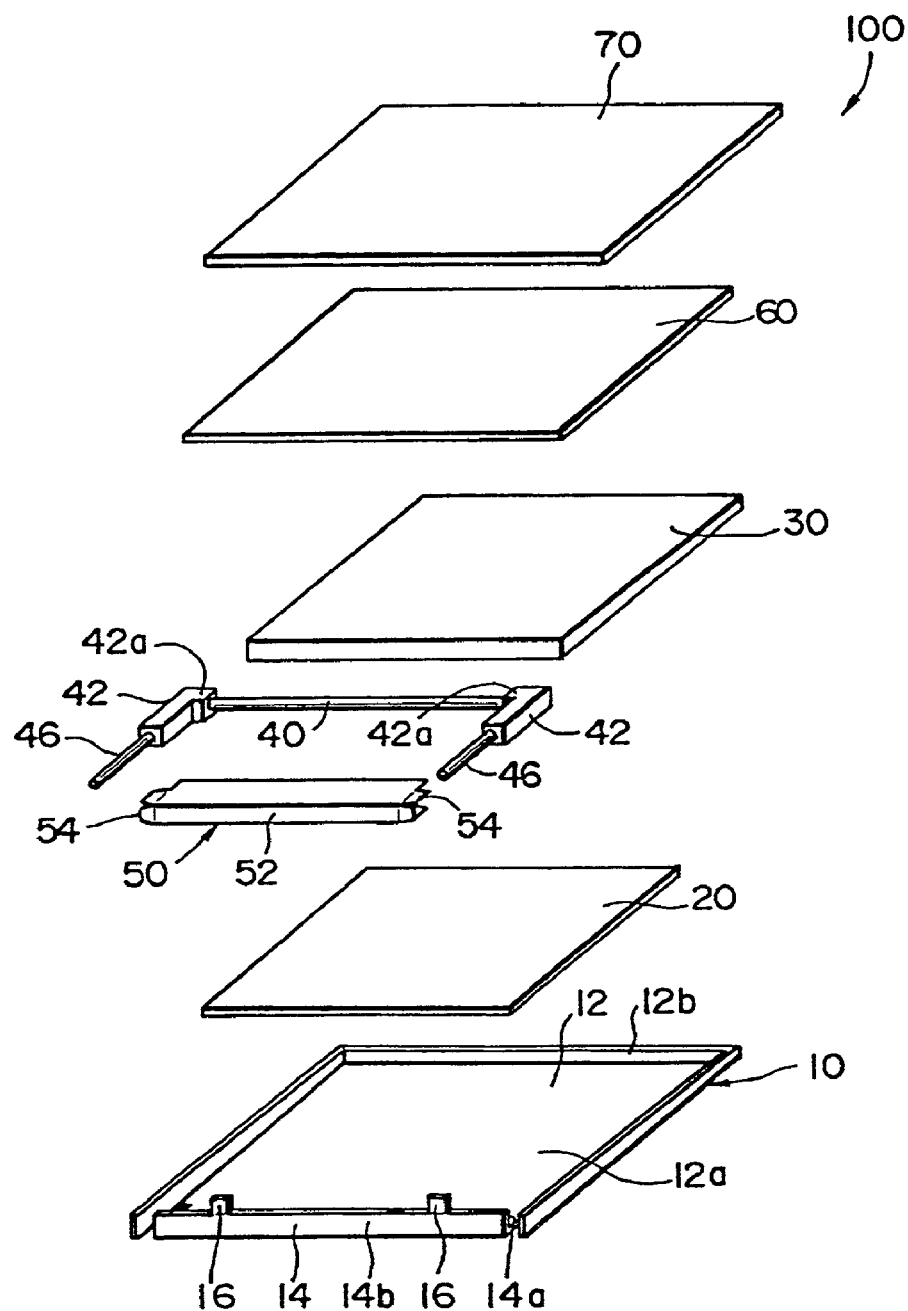
FIG. 1 is an exploded perspective view diagrammatically showing a surface light source device of the present invention.

A side-lighting type surface light source device, an electrooptical apparatus and electronic equipment of the present invention are discussed, referring to the drawings.

Figure 2:
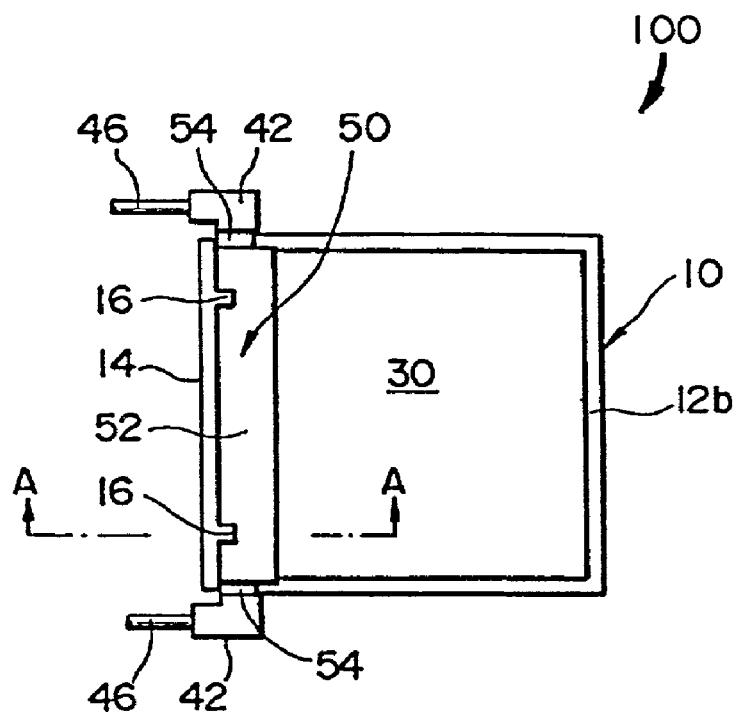
FIG. 2 is a plan view diagrammatically showing the surface light source device of FIG. 1.
Figure 3:
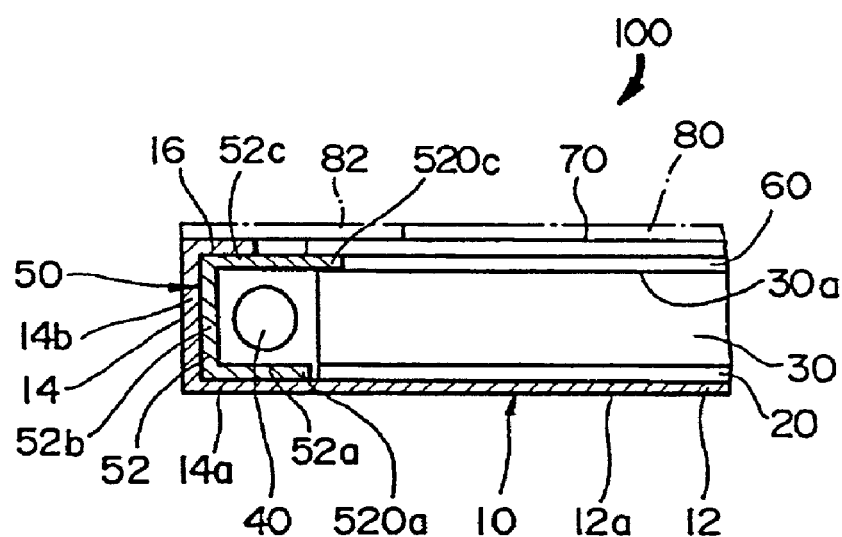
FIG. 3 is a partial cross-sectional view of the surface light source device taken along line A—A in FIG. 2.

FIG. 1 is an exploded perspective view diagrammatically showing a side-lighting type surface light source device (hereinafter referred to as a "surface light source device") 100 of the present invention, FIG. 2 is a plan view diagrammatically showing the light source device 100, and FIG. 3 is a partial cross-sectional view of the light source device 100 taken along line A—A shown in FIG. 2. A prism sheet and a diffusion sheet are not shown in FIG. 2.

The surface light source device 100 of this embodiment includes a fixing member 10, a reflective sheet 20 arranged on the fixing member 10, a light guide plate member 30 arranged on the reflective sheet 20, a light source 40 for supplying light to the light guide plate member 30, and a reflector member 50 for supporting the light source 40. The surface light source device 100 of this embodiment further includes a prism sheet 60 on the light guide plate member 30, and a diffusion sheet 70 on the prism sheet 60, as necessary.

The fixing member 10 includes a fixing body 12, a reflector holder 14 continuously and integrally formed with the fixing body 12, and lug portions 16. The fixing member 12 includes a back portion (a support surface) 12a for supporting the reflective sheet 20 and the light guide plate member 30, and a side portion 12b on three sides of the back portion 12a. The side portion 12b serves as a member for supporting a protective frame to be described later and the surface light source device when a liquid-crystal display panel, the protective frame, and the surface light source device are assembled.

The fixing member 10 includes the reflector holder 14 for fixing the reflector member 50 on the remaining side of the back portion 12a. The reflector holder 14 has a generally L-shaped configuration in cross section, and includes a back portion 14a flush with the back portion 12a of the fixing body 12, a side portion 14b perpendicularly extending from the back portion 14a. A plurality of lug portions 16 extending from the top edge of the side portion 14b.

The material of the fixing member 10 is preferably a metal, such as a tin-plated steel plate (so-called tinplate), a copper-based material like phosphor bronze, an aluminum-based material, or an alloy. The use of a metallic material permits a thin and mechanically strong design and provides a high heat dissipation for heat conducted from the light source or the like.

The light source 40 is formed of a linear primary light source, such as a cold cathode tube. The light source 40 is supported at both terminals thereof by rubber holders 42 and 42. The holder 42 has an L-shaped configuration in plan view. One projecting portion 42a (see FIG. 1) of the holder 42 at one terminal of the light source 40 is engaged with a light source fixing portion 54 of the reflector member 50 to be discussed. The light source 40 is connected to a power source (not shown) via a power cable 46 extending from the other projecting portion of the holder 42.

Referring to FIG. 2 and FIG. 3, the reflector member 50 includes a reflector body 52 having a horizontally aligned U shape in cross section and the light source fixing portions 54 arranged on both sides of the reflector body 52. As shown in FIG. 3, the reflector body 52 includes mutually opposed back portion 52a and front portion 52c, and a side portion 52b generally perpendicular to the back portion 52a and the front portion 52c. A first end portion 520c is formed of an end of the front portion 52c, and a second end portion 520a is formed of an end of the back portion 52a. The first end portion 520c projects more than the second end portion 520a. In other words, the front portion 52c has a width thereacross wider than that of the back portion 52a.

The light source fixing portion 54 of the reflector member 50 includes three planar portions arranged along the three sides of the reflector body 52. The light source fixing portion 54 receives at the opening thereof the projecting portion 42a of the holder 42. In this way, the holder 42 is held by elasticity of the planar portions constituting the light source fixing portion 54.

The material of the reflector member 50 is preferably a metal, such as a tin-plated steel plate (so-called tinplate), a copper-based material such as phosphor bronze, an aluminum-based material, or an alloy. The use of a metallic material permits a thin and mechanically strong design and provides a high heat dissipation for heat conducted from the light source or the like.

The prism sheet 60 and the diffusion sheet 70 are stacked onto a light exit surface 30a of the light guide plate member 30. A projection or a lug portion may be formed on the back portion 12a of the fixing member 10 to align or fix the reflective sheet 20 and the light guide plate member 30.

In the surface light source device 100 of this embodiment, the reflector member 50 is secured in a clamped state between the reflector holder 14 of the fixing member 10 and the lug portions 16 as shown in FIG. 3. The reflective sheet 20 and the light guide plate member 30 are secured in a clamped state between the back portion 12a of the fixing member 10 and the first end portion 520c of the reflector member 50.

In the surface light source device 100 of this embodiment, a gap occurs between the second end portion 520a of the reflector member 50 and the reflective sheet 20. The gap is substantially reduced in design (to 200–500 µm, for instance), and is covered with the back portions 12a and 14a of the fixing member 10. Compared to the case in which both-side adhesive tapes are employed, light straying through the gap is minimized to such a low level that requires almost no consideration.

In the surface light source device 100 of this embodiment, light rays emitted from the light source 40 are reflected from the reflector member 50, and are incident on the end surface of the light guide plate member 30. The light rays incident on the light guide plate member 30 are diffused within the light guide plate member 30 while a directivity is imparted to the light rays. The light rays are reflected from the reflective sheet 20 and exit through the light exit surface 30a of the light guide plate member 30. The output light rays are corrected by the prism sheet 60 in the directivity, and are further diffused through the diffusion sheet 70 in a predetermined region.

In this embodiment, the type and material of each component forming the surface light source device 100 are not limited, and may be known ones. The example of the construction of each component is now discussed.

The reflective sheet 20 may be a sheetlike specular reflection member constructed of a metal foil, for instance, or a sheetlike irregular reflection member constructed of a white PET (polyethylene terephtalate) film, for instance.

The light guide plate member 30 may be a light guide plate plate having a wedge configuration in cross section. Such a light guide plate plate may be of a matrix of a resin, such as polymethylmethacrylate, with light guiding particles having a reflectance different from that of the resin dispersed therewithin. Alternatively, the light guide plate member 30 may be a planar member having a scattering film on at least one of the light exiting surface thereof and the surface opposed to the light exiting surface.

The prism sheet 60 has the function of correcting the light directivity of the light rays exiting from the light guide plate member 30. The prism sheet may be formed of a sheet member having a light guiding property, such as polycarbonate, and a prism surface is formed on part of the surface thereof. Such a prism sheet may be arranged with the prism surface thereof facing the light guide plate member 30.

The diffusion sheet 70 has the function of controlling a light diffusion region. Such a diffusion sheet may be produced by emboss-processing PET (polyethylene terephtalate). With the diffusion sheet, moire resulting from the liquid-crystal display panel and the prism sheet may be prevented.

The surface light source device 100 of this embodiment has the following operation and advantages.

(1) The reflective sheet 20 and the light guide plate member 30 are clamped between the back portion 12a of the fixing member 10 and the first end portion 520c of the reflector member 50, and is mechanically secured by the elasticity of the first end portion 520c. The reflector member 50 is clamped between the reflector holder 14 and the lug portion 16 of the fixing member 10, and is similarly secured by the elasticity of the lug portion 16. Since unlike the conventional art, this arrangement eliminates the need for the both-side adhesive tape for fixing the reflective sheet and the light guide plate member, a typical thickness of 0.2–0.4 mm corresponding to the thickness of the two layers of both-side adhesive tape is reduced. In accordance with this embodiment, the surface light source device 100 becomes thin, compared to the conventional surface light source.

(2) The first end portion 520c of the reflector member 50 for clamping the reflective sheet 20 and the light guide plate member 30 is set be narrower than the width of the both-side adhesive tape, and, compared to the both-side adhesive tape, light absorption and scattering are reduced by selecting the material of the reflector member 50. Compared to the case in which the both-side adhesive tape is used as fixing means, the light rays from the light source 40 are effectively used.

The surface light source device 100 of this embodiment is manufactured through the following process including manufacturing steps (A)–(C). These manufacturing steps are shown in FIGS. 4(A)–FIG. 4(C).

Figure 4:
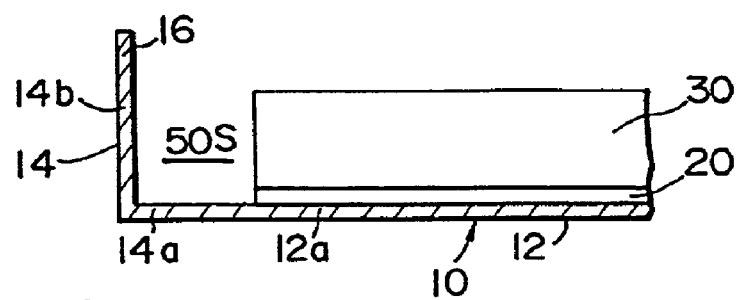
FIGS. 4(A)–4(C) are partial cross-sectional views showing manufacturing steps of the surface light source of FIG. 1.
Figure 4:
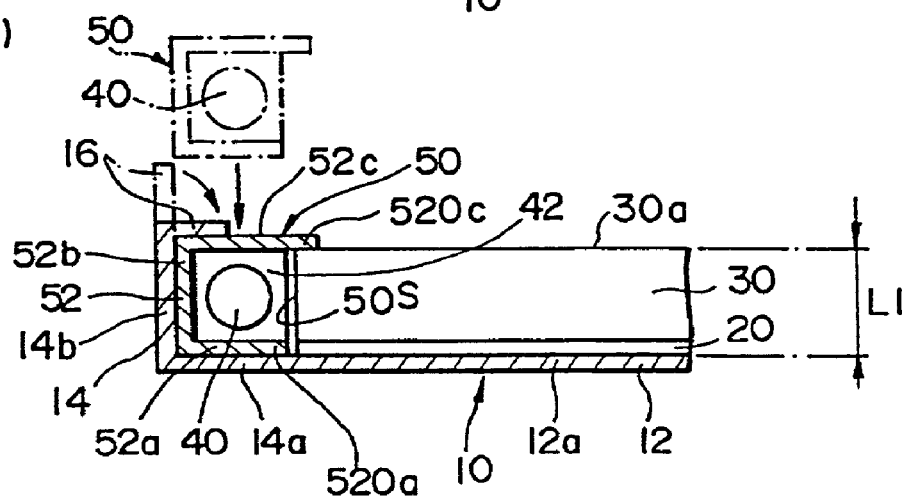
Figure 4:
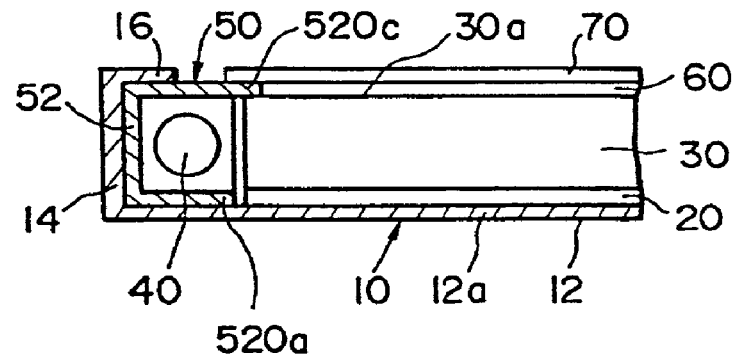

(A) Referring to FIG. 4(A), the reflective sheet 20 and the light guide plate member 30 are arranged in that order on the back portion 12a of the fixing member 10 at a predetermined position. The reflective sheet 20 is aligned in the predetermined position in accordance with projections (not shown) formed on the back portion 12a of the fixing member 10. The light guide plate member 30 is similarly aligned in the predetermined position in accordance with the projections. The reason why the reflective sheet 20 and the light guide plate member 30 are easily aligned in the predetermined position is that the projections are arranged at the four corners of the fixing member 10 on which the reflective sheet 20 and the light guide plate member 30 are mounted.

Space 50S for accommodating the reflector member 50 (see FIG. 4(B)) is formed on the back portion 14a of the reflector holder 14 of the fixing member 10. The width of the back portion 14a along the short side thereof, defining the space 50S, is approximately equal to or slightly narrower than the width of the back portion 52a of the reflector member 50. The width of the front portion 52c of the reflector member 50 along the short side thereof is slightly wider than the width of the back portion 52a along the short side thereof. In this manufacturing stage, the lug portions 16 of the fixing member 10 are not yet bent, and are substantially flush with the side portion 14b of the reflector holder 14.

(B) In succession, as shown in FIG. 4(B), the reflector member 50 having the light source 40 assembled therewithin is arranged in the space 50S between the reflector holder 14 and the light guide plate member 30. The reflector member 50 is fitted into the space 50S with the back portion 52a having the second end portion 520a looking downward. The reflector member 50 is thus mounted with the first end portion 520c of the front portion 52c abutting the light exit surface 30a of the light guide plate member 30.

Specifically, in this embodiment, a length L1 from the underside of the first end portion 520c of the reflector member 50 to the underside of the second end portion 520a of the reflector member 50 is the sum of the thickness of the reflective sheet 20 and the thickness of the end portion of the light guide plate member 30 on the side of the light source 40, i.e., the length from the top surface of the back portion 12a of the fixing member 10 to the top surface of the light guide plate member 30 on the side of the light source 40. In this arrangement, the reflective sheet 20 and the light guide plate member 30 are firmly secured between the back portion 12a of the fixing member 10 and the first end portion 520c of the reflector member 50.

By bending the lug portions 16 of the fixing member 10 at predetermined positions, the reflector member 50 is secured in place. Specifically, the reflector member 50 is secured by the reflector holder 14 and the lug portions 16 of the fixing member 10.

(C) In succession, as shown in FIG. 4(C), optical sheets, such as the prism sheet 60 and the diffusion sheet 70, are arranged on the light guide plate member 30 as required. These sheets are secured with unshown fixing means. Such fixing means may also serve as fixing means for fixing an electrooptical apparatus which incorporates the surface light source device 100 of this embodiment. In this arrangement, no separate fixing means for fixing the optical sheets is required, the component count is reduced, and the assembly process is simplified. A projection or a lug portion may be arranged on the fixing member 10 to define the mounting positions of the optical sheets, such as the prism sheet 60 and the diffusion sheet 70.

The manufacturing method provides the following operation and advantages.

(1) In the step (B), the reflective sheet 20 and the light guide plate member 30 are first secured by the back portion 12a of the fixing member 10 and the first end portion 520c of the reflector member 50. Furthermore, the reflector member 50 is secured by the reflector holder 14 and the lug portions 16 of the fixing member 10. The reflective sheet 20 and the light guide plate member 30 are therefore secured by the reflector member 50 and the fixing member 10.

In accordance with the present embodiment, the reflective sheet 20 and the light guide plate member 30 are secured by mechanical elasticity without using adhesive means such as both-side adhesive tape. Specifically, in the assembly process of the reflector member 50, the reflector member 50 is fixed by a simple method of bending the lug portions 16, and the reflective sheet 20 and the light guide plate member 30 are secured by securing the reflector member 50. This arrangement resolves a poor working efficiency problem arising from using the both-side adhesive tape, reducing the number of assembly steps, and thereby substantially contributing to reduction in manufacturing costs.

(2) The reflector member 50 is arranged in the predetermined position by a simple process of inserting the reflector member 50 into the space 50S of the reflector holder 14. The reflector member 50 is thus assembled without the need for high alignment accuracy and precise bonding technique, and thus simplifies the assembly process.

(3) In accordance with the present embodiment, in the assembly process of the reflector member 50, the reflector member 50 is fixed by a simple method of bending the lug portions 16. Even if the positioning of the reflector member is not successful, a rework is easily performed by straightening the lug portion again.

Figure 5:
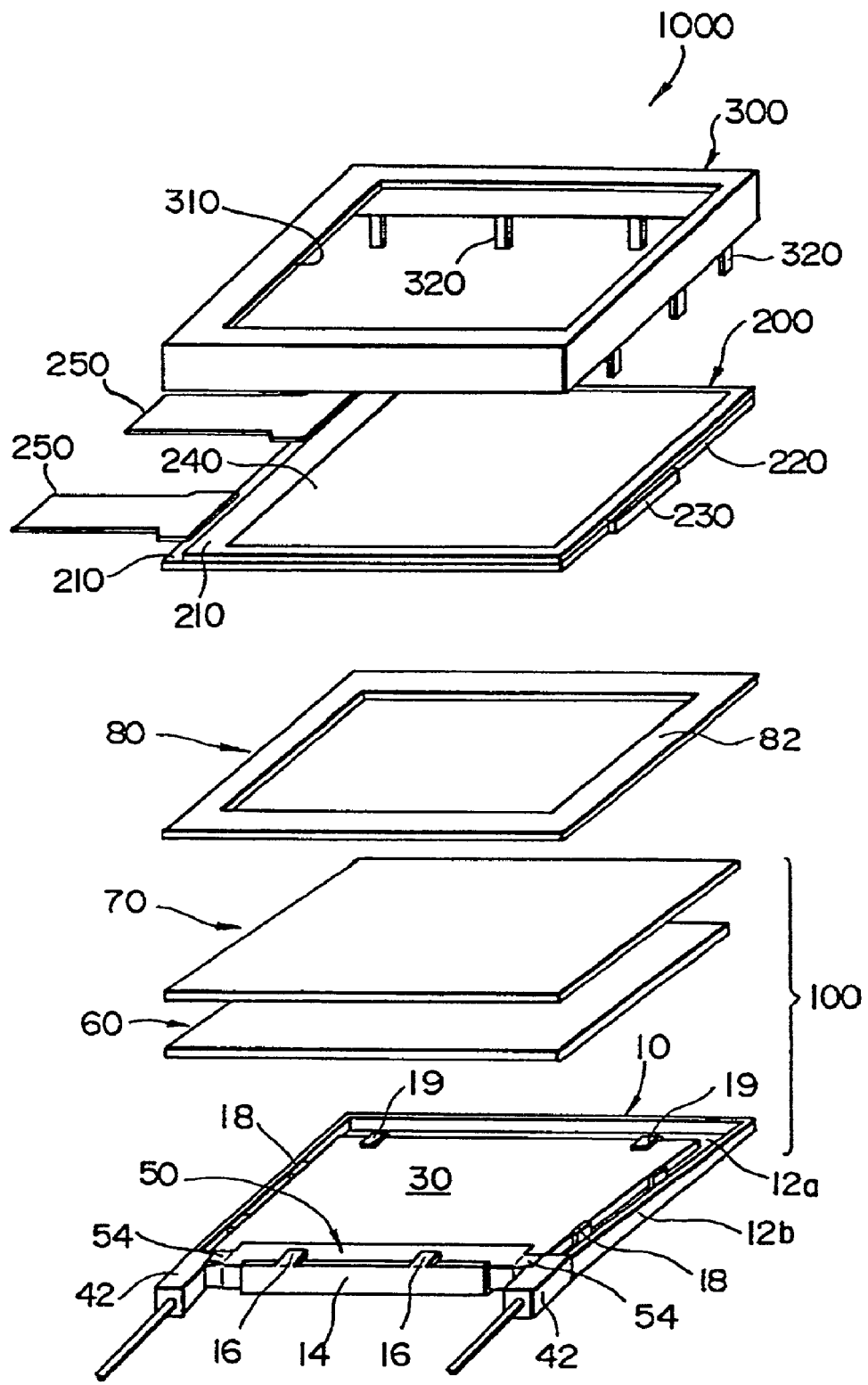
FIG. 5 is an exploded perspective view diagrammatically showing a liquid-crystal display unit in which the surface light source device of the present invention is incorporated.

Discussed next is an embodiment in which the surface light source device of this embodiment is implemented in an electrooptical apparatus. In this embodiment, the surface light source device of the present invention is incorporated in a liquid-crystal display unit. FIG. 5 is an exploded perspective view diagrammatically showing a liquid-crystal display unit 1000 of this embodiment.

The liquid-crystal display unit 1000 of this embodiment includes a liquid-crystal display panel 200 as an electrooptical display unit, a protective frame 300 arranged on the front of the liquid-crystal display panel 200, and a surface light source device 100 arranged behind the liquid-crystal display panel 200. In this embodiment, a spacer sheet 80 is arranged between the liquid-crystal display panel 200 and the surface light source device 100.

The protective frame 300 includes a display window 310 having a size corresponding to the display area of the liquid-crystal display panel 200, and physically protects the liquid-crystal display panel 200. A plurality of lug portions 320 for fixing are arranged on the lower edge of the protective frame 300. These lug portions 320 are bent to fix each component, after assembling the surface light source device 100, the spacer sheet 80, the liquid-crystal display panel 200, and the protective frame 300.

In the liquid-crystal display panel 200, a liquid crystal is encapsulated between a pair of opposed substrates 210 and 210, and a polarizer 240 is glued onto the front substrate 210. The liquid-crystal display panel 200 has, on an end surface 220 thereof, a sealing section 230 for encapsulating the liquid crystal after injecting the liquid crystal. The liquid-crystal display panel 200 has wiring boards 250 and 250, such as FPC (flexible printed circuit board), connected to the terminal section thereof.

The spacer sheet 80 has a frame structure and has a window through which light rays are transmitted. The spacer sheet 80 has the function of preventing the diffusion sheet 70 from being scratched when the liquid-crystal display panel 200 rubs against the diffusion sheet 70 arranged behind the liquid-crystal display panel 200. The spacer sheet 80 is preferably formed of a material that does not transmit the light ray exiting from the light guide plate member 30 of the surface light source device 100.

In this embodiment, the spacer sheet 80 is preferably arranged with the frame portion 82 thereof abutting a border area between the first end portion 520c of the reflector member 50 and the prism sheet 60 as shown in FIG. 3. With the spacer sheet 80 arranged in this way, light rays are prevented from being strayed through a gap between the prism sheet 60 and the first end portion 520c of the reflector member 50, and the light from the light source 40 is thus efficiently utilized.

Since the surface light source device 100 is substantially identical to the above-referenced surface light source device 100 of the first embodiment, like components are identified with like reference numerals, and the detailed discussion thereabout is omitted here.

As shown in the example in FIG. 5, the back portion 12a of the fixing member 10 has a plurality of projections 18 for aligning the reflective sheet 20 and the light guide plate member 30, and a plurality of lug portions 19 for fixing the light guide plate member 30. The projections 18 and the lug portions 19 are arranged as required, and by arranging the projections 18 and the lug portions 19, the alignment and fixing of the light guide plate member 30 is consolidated.

Figure 6:
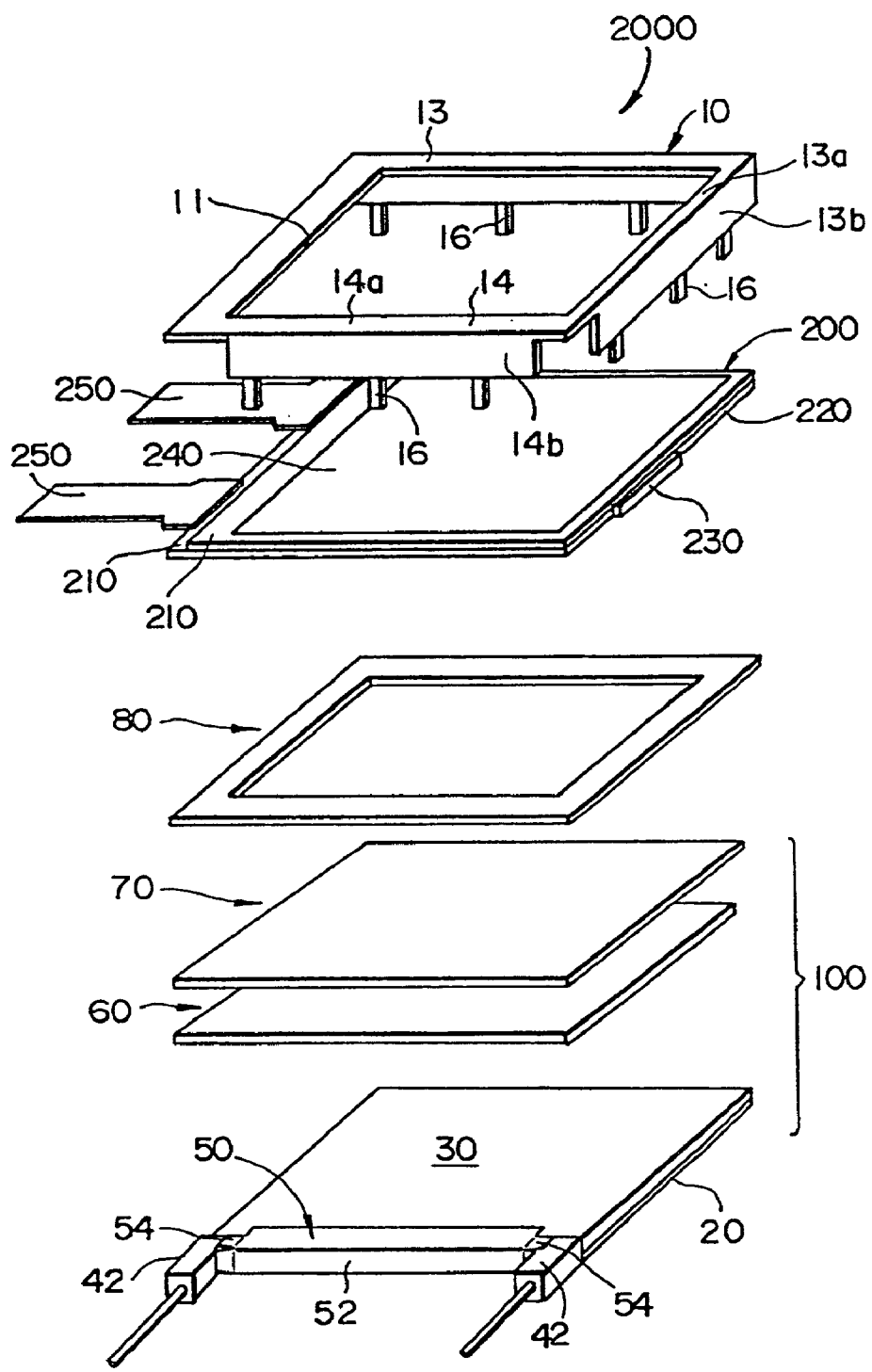
FIG. 6 is an exploded perspective view diagrammatically showing a liquid-crystal display unit in which the surface light source device of the present invention is incorporated.
Figure 7:
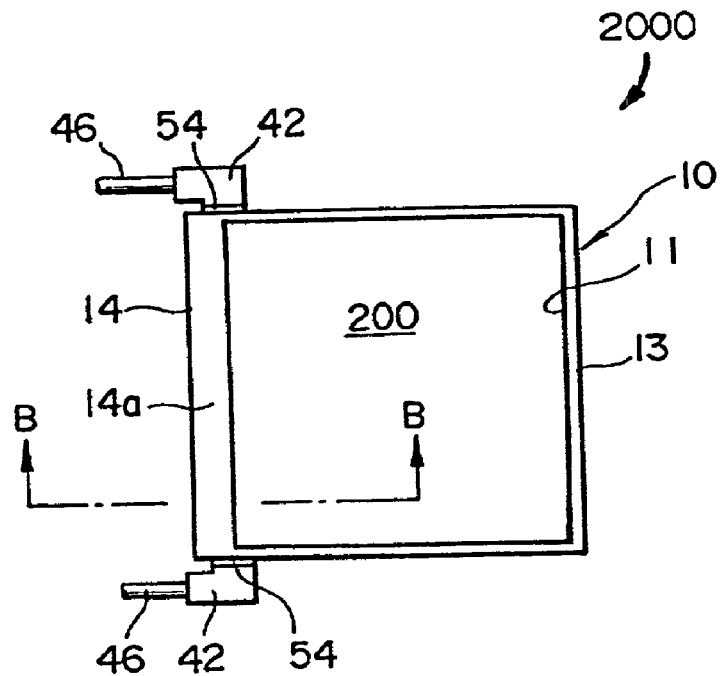
FIG. 7 is a plan view diagrammatically showing the liquid-crystal display unit of FIG. 6.
Figure 8:
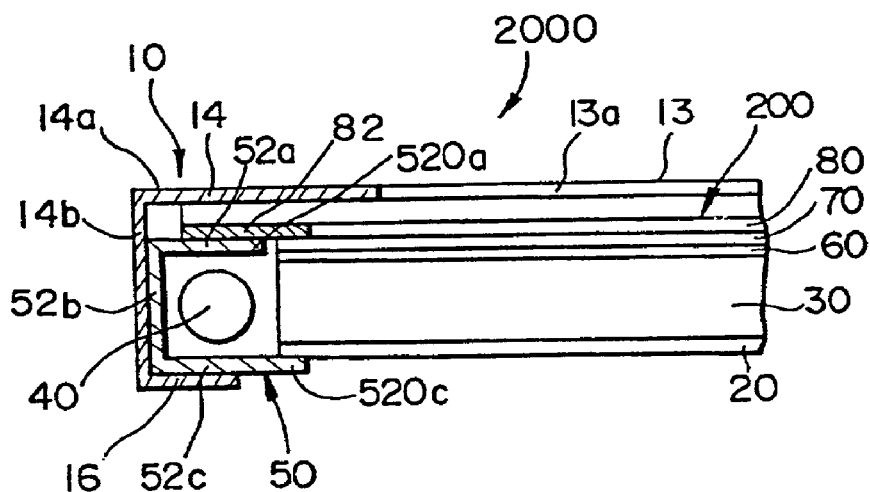
FIG. 8 is a partial cross-sectional view of the liquid-crystal display unit taken along line B—B in FIG. 7.

Discussed next is another embodiment in which the surface light source device of this invention is incorporated in an electrooptical apparatus. In this embodiment, the surface light source device of this invention is incorporated in a liquid-crystal display unit. FIG. 6 is an exploded perspective view diagrammatically showing a liquid-crystal display unit 2000 of this embodiment, FIG. 7 is a plan view diagrammatically showing the liquid-crystal display unit 2000, and FIG. 8 is a cross-sectional view of the liquid-crystal display unit 2000 taken along line B—B in FIG. 7.

The surface light source device 100 is now discussed, focusing the features of this embodiment, and components having functions substantially identical to those of the preceding surface light source device 100 are designated with the same reference numerals, and the detailed discussion thereabout is omitted here.

The liquid-crystal display unit 2000 of this embodiment is different from the first and second embodiments in that the fixing member of the surface light source device 100 also serves as the fixing member of the liquid-crystal display unit.

The liquid-crystal display unit 2000 of this embodiment includes a liquid-crystal display panel 200 as an electrooptical display unit, a fixing member 10 arranged on the front of the liquid-crystal display panel 200, and a surface light source device 100 arranged behind the liquid-crystal display panel 200. In this embodiment, a spacer sheet 80 is arranged between the liquid-crystal display panel 200 and the surface light source device 100.

The fixing member 10 includes a display window 11 having a size corresponding to the display area of the liquid-crystal display panel 200, and has the function of physically protecting the liquid-crystal display panel 200, besides the function of fixing means.

The fixing member 10 includes a fixing body 13, a reflector holder 14 continuously and integrally formed with the fixing body 13, and lug portions 16. The fixing body 13 includes a front portion (a support surface) 13a covering the top surface of the liquid-crystal display panel 200 in a ring configuration, and side portions 13b extending along the three sides of the front portion 13a. The side portions 13b have the function of protecting the internal structure of the liquid-crystal display unit 2000.

The fixing member 10 includes the reflector holder 14 for securing the reflector member 50 to the remaining side of the front portion 13a. As shown in FIG. 8, the reflector holder 14 has a generally L shape in cross section, and includes a front portion 14a flush with the front portion 13a of the fixing body 13, and a side portion 14b generally perpendicular to the front portion 14a. A plurality of lug portions 16 are formed at the lower edge of the side portion 14b.

Since the liquid-crystal display panel 200 has the same construction as that of the liquid-crystal display panel 200 discussed in connection with the second embodiment, the discussion thereabout is omitted here.

Since the spacer sheet 80 has the same construction and function as those of the spacer sheet 80 discussed in connection with the second embodiment, the discussion thereabout is omitted here. In this embodiment as well, the spacer sheet 80 is preferably arranged with the frame portion 82 thereof abutting a border area between the first end portion 520a of the reflector member 50 and the prism sheet 60 as shown in FIG. 8. With the spacer sheet 80 arranged in this way, light rays are prevented from being strayed through a gap between the prism sheet 60 and the second end portion 520a of the reflector member 50, and the light from the light source 40 is thus efficiently utilized.

The light source device 100 of this embodiment includes the above-discussed fixing member 10, the reflective sheet 20 arranged on the fixing member 10, the light guide plate member 30 arranged on the reflective sheet 20, the light source 40 for supplying light to the light guide plate member 30, and the reflector member 50 for supporting the light source 40. The light source device 100 of this embodiment further includes the prism sheet 60 on the light guide plate member 30, and the diffusion sheet 70 on the prism sheet 60, as necessary.

The reflective sheet 20, the light guide plate member 30, the light source 40 and the support structure thereof, the prism sheet 60, and the diffusion sheet 70 remain unchanged from those in the first embodiment, and the discussion thereabout is omitted here.

Referring to FIG. 8, the reflector member 50 includes a reflector body 52 having a horizontally aligned U shape in cross section and light source fixing portions 54 arranged on both sides of the reflector body 52. The reflector body 52 includes mutually opposed front portion 52a and back portion 52c, and a side portion 52b generally perpendicular to the front portion 52a and the back portion 52c. A first end portion 520c is formed of an end of the back portion 52c, and a second end portion 520a is formed of an end of the front portion 52a. The first end portion 520c projects more than the second end portion 520a. In other words, the back portion 52c has a width thereacross wider than that of the front portion 52a.

Since the light source fixing portion 54 of the reflector member 50 has the same construction as that of the light source fixing portion 54 in the first embodiment, the detailed discussion thereabout is omitted here.

As shown in FIG. 8 in this embodiment, the reflector member 50 is secured in a clamped state between the reflector holder 14 and the lug portions 16 of the fixing member 10.

In this embodiment, the spacer sheet 80 and the liquid-crystal display panel 200 are clamped between the front portion 52a of the reflector member 50 and both the front portion 13a of the fixing member 10 and the front portion 14a of the reflector holder 14. Specifically, the reflective sheet 20, the light guide plate member 30, the prism sheet 60, the diffusion sheet 70, the spacer sheet 80, and the liquid-crystal display panel 200 are arranged between the back portion 52c of the reflector member 50 and the front portions 13a and 14a of the fixing member 10.

In this embodiment, a gap occurs between the front portion 52a of the reflector member 50 and the diffusion sheet 70. The gap is substantially reduced in design (to 200–500 μm, for instance), and is covered with the spacer sheet 80. Compared to the case in which both-side adhesive tapes are employed, the light straying through the gap is minimized to such a low level that requires almost no consideration.

In the present embodiment, as in the first embodiment, the type and material of each component forming the surface light source device are not limited to particular ones, and may be any known type and material may be employed.

The liquid-crystal display unit 2000 of this embodiment provides the following operation and advantages.

(1) The reflective sheet 20, the light guide plate member 30, the prism sheet 60, the diffusion sheet 70, the spacer sheet 80, and the liquid-crystal display panel 200 are clamped between the front portions 13a and 14a of the fixing member 10 and the first end portion 520c of the reflector member 50, and are mechanically secured by the elasticity of the first end portion 520c. The reflector member 50 is clamped between the reflector holder 14 and the lug portions 16 of the fixing member 10, and is also mechanically secured by the elasticity of the lug portions 16. This embodiment is assembled with the spacer sheet 80 and the liquid-crystal display panel 200 interposed between the front portion 52a of the reflector member 50 and the front portion 13a of the fixing member 10.

Since unlike the conventional art, this arrangement eliminates the need for the both-side adhesive tape for fixing the reflective sheet, the light guide plate member, and other components, a typical thickness of 0.2–0.4 mm corresponding to the thickness of the two layers of both-side adhesive tape is reduced. In accordance with the surface light source device 100 of this embodiment, the surface light source device 100 becomes thin, compared to the conventional surface light source.

(2) The first end portion 520c of the reflector member 50 for clamping components, such as the reflective sheet 20, the light guide plate member 30, the prism sheet 60, the diffusion sheet 70, the spacer sheet 80, and the liquid-crystal display panel 200, is set to be narrower than the width of the both-side adhesive tape, and light absorption and scattering are reduced by selecting the material of the reflector member 50, compared to the both-side adhesive tape. Compared to the case in which the both-side adhesive tape is used as fixing means, the light rays from the light source 40 are effectively used.

Figure 9:
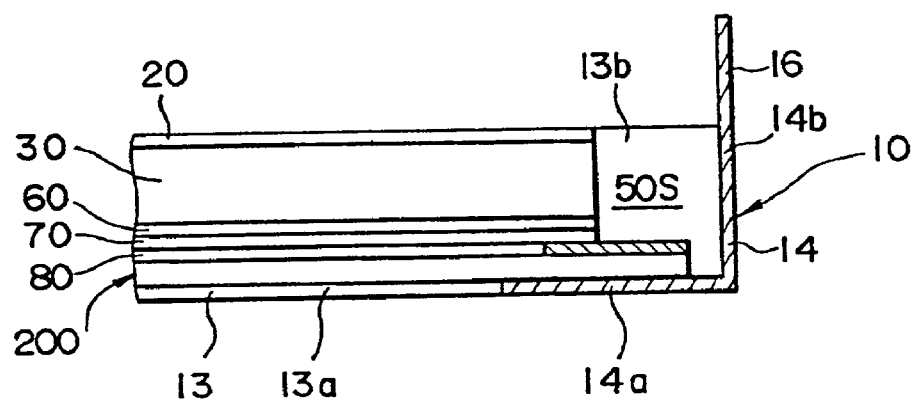
FIGS. 9(A) and 9(B) are partial cross-sectional views showing the manufacturing steps of the liquid-crystal display unit of FIG. 6.
Figure 9:
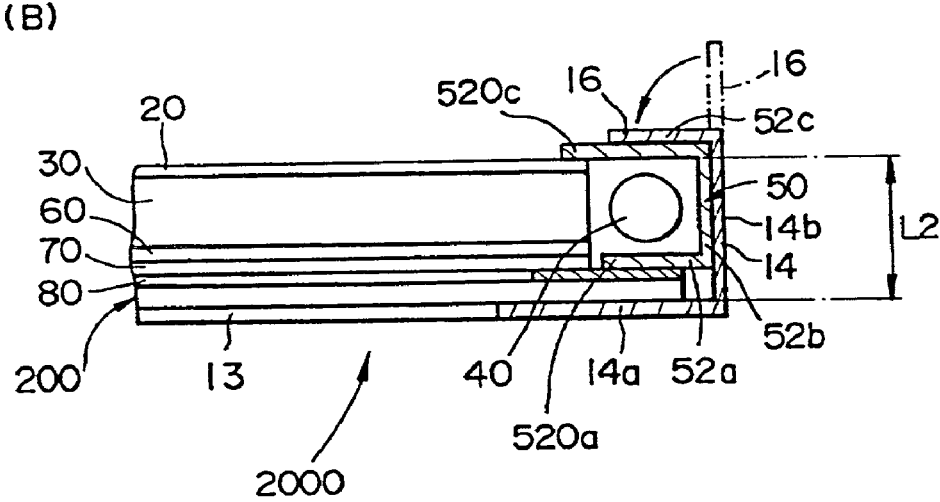

The liquid-crystal display unit 2000 of this embodiment is manufactured through the following process including manufacturing steps (A) and (B). These manufacturing steps are shown in FIG. 9(A) and FIG. 9(B). Referring to FIG. 9(A) and FIG. 9(B), the liquid-crystal display unit 2000 is shown inverted from the state shown in FIG. 8.

(A) Referring to FIG. 9(A), the liquid-crystal display panel 200, the spacer sheet 80, the diffusion sheet 70, the prism sheet 60, the light guide plate member 30, and the reflective sheet 20 are arranged in that order on the front portion 13a of the fixing member 10.

Space 50S for accommodating the reflector member 50 (see FIG. 9(B)) is formed on the front portion 14a of the reflector holder 14 of the fixing member 10. The width of the front portion 14a along the short side thereof, defining the space 50S, is approximately equal to or slightly narrower than the width of the front portion 52a of the reflector member 50. The back portion 52c of the reflector member 50, along the short side thereof, is set to be slightly wider than the width of the front portion 52a along the short side thereof. In this manufacturing stage, the lug portions 16 of the fixing member 10 are not yet bent, and are substantially flush with the side portion 14b of the reflector holder 14.

(B) Referring to FIG. 9(B), the reflector member 50 having the light source 40 assembled therewithin is arranged in the space 50S between the reflector holder 14 and the light guide plate member 30. The reflector member 50 is fitted into the space 50S with the front portion 52a having the second end portion 520a looking downward. The reflector member 50 is thus mounted with the first end portion 520c of the back portion 52c abutting the top surface of the reflective sheet 20.

By bending the lug portions 16 of the fixing member 10, the reflector member 50 is secured. Specifically, the reflector member 50 is secured along with another component by the reflector holder 14 and the lug portions 16 of the fixing member 10.

Specifically, in this embodiment, a length L2 from the underside of the first end portion 520c of the reflector member 50 to the top surface of the front portion 14a of the reflector holder 14 is set to be the sum of the thicknesses of the liquid-crystal display panel 200, the spacer sheet 80, the diffusion sheet 70, the prism sheet 60, the light guide plate member 30, and the reflective sheet 20. With this arrangement, the liquid-crystal display panel 200, the spacer sheet 80, the diffusion sheet 70, the prism sheet 60, the light guide plate member 30, and the reflective sheet 20 are secured by the front portion 13a of the fixing member 10 and the first end portion 520c of the reflector member 50.

The manufacturing method thus provides the following operation and advantages.

(1) In the step (A), a member, other than the light source and the reflector member for securing the light source, is stacked on the front portions 13a and 14a of the fixing member 10 in a predetermined position. Since the use of both-side tape or other adhesive means is not required, the alignment of each component is easily performed.

(2) In the step (B), all components are easily secured by a simple process of bending the lug portions 16 of the fixing member 10 after placing the reflector member 50 in the predetermined position. In this way, in this embodiment, the reflective sheet 20 and the light guide plate member 30 are secured by the mechanical elasticity of the lug portions 16 without using adhesive means such as both-side adhesive tape. Specifically, in the assembly process of the reflector member 50, the reflector member 50 and other components are fixed by a simple method of bending the lug portions 16. This arrangement resolves a poor working efficiency problem arising from using the both-side adhesive tape, reducing the number of assembly steps, and thereby substantially contributing to reduction in manufacturing costs.

(3) Since the reflector member 50 is arranged in the predetermined position by a simple process of inserting the reflector member 50 into the space 50S of the reflector holder 14, the reflector member 50 is thus assembled without the need for high alignment accuracy and precise bonding technique, and thus simplifies the assembly process.

(4) In accordance with the present embodiment, in the assembly process of the reflector member 50, the reflector member 50 is fixed by a simple method of bending the lug portions 16. Even if the positioning of the reflector member is not successful, a rework is easily made by straightening the lug portion again.

Discussed next is an embodiment of electronic equipment which incorporates a liquid-crystal display unit as the electrooptical apparatus of the present invention.

(1) Digital still camera

Figure 12:
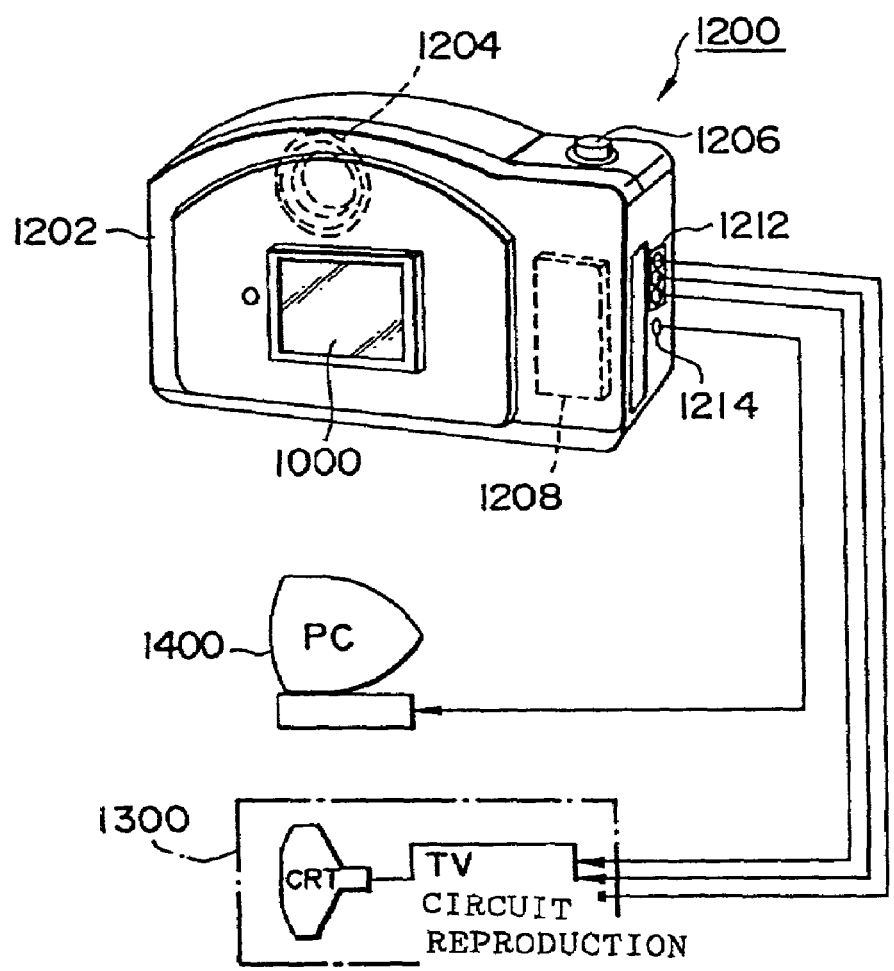
FIG. 12 is an external view of a digital still camera which is electronic equipment that incorporates the liquid-crystal display unit of the present invention.

Discussed here is a digital still camera in which the liquid-crystal display unit of the present invention is incorporated as a finder. FIG. 12 is a perspective view showing the construction of the digital still camera, and also simply showing a connection with external devices.

Ordinary cameras expose a film to the image of a subject, while a digital still camera 1200 produces a video signal by photoelectrically converting the image of a subject through an image pickup device such as a CCD (Charge Coupled-Device). The digital still camera 1200 includes the liquid-crystal display panel, such as the above-referenced liquid-crystal display unit 1000, behind a case 1202 (in front of the case 1202 in FIG. 12), and presents a display in accordance with the video signal from the CCD. The liquid-crystal display unit 1000 functions as a finder for presenting the image of the subject. A light receiving unit 1204, including an optical lens and the CCD, is arranged on the front of the case 1202 (on the back of the case 1202 in FIG. 12).

When a photographer presses a shutter button 1206 recognizing the subject image presented on the liquid-crystal display unit 1000, the video signal on the CCD at the moment is transferred to and stored in a memory in a circuit board 1208. In the digital still camera 1200, video signal output terminals 1212 and an input/output terminal 1214 for data communication are provided on one side surface of the case 1202. As shown in FIG. 12, as necessary, a television monitor 1300 is connected to the video signal output terminals 1212, and a personal computer 1400 is connected to the input/output terminal 1214 for data communication. In response to predetermined operations, the video signal stored in the memory in the circuit board 1208 is output to the television monitor 1300 or the personal computer 1400.

(2) Portable telephone and other electronic equipment

Figure 10:
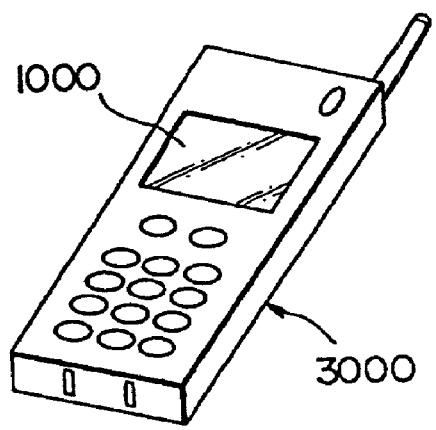
Figure 10:
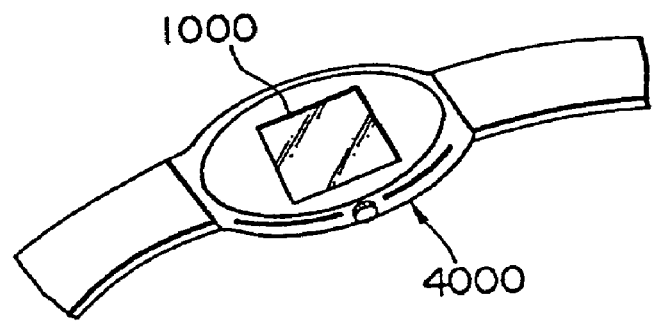
Figure 10:
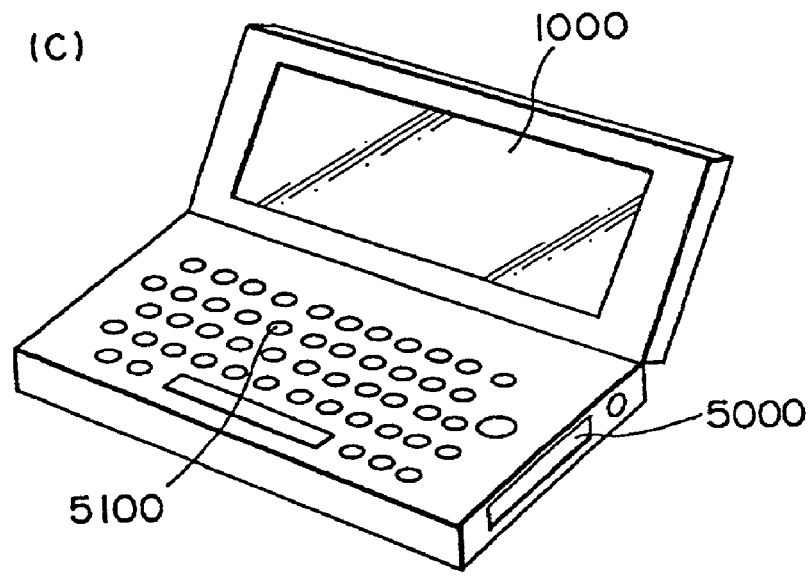
Figure 11:
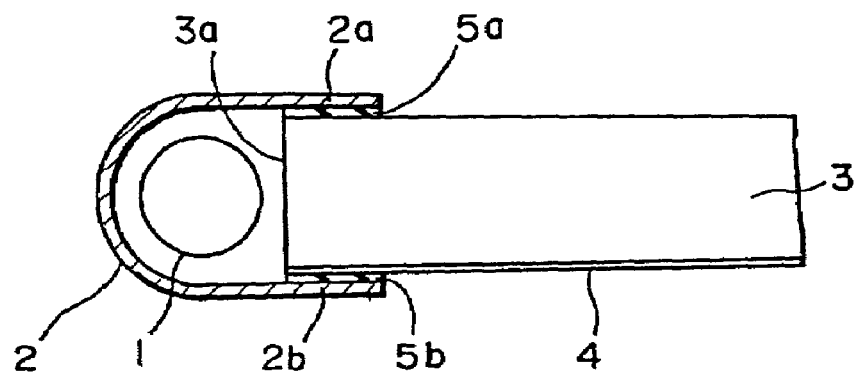
FIG. 11 is a partial cross-sectional view diagrammatically showing one example of a conventional side-lighting type surface light source device.

FIGS. 10(A), 10(B) and 10(C) are external views of electronic equipment which incorporates a liquid-crystal display unit as the electrooptical apparatus of the present invention. FIG. 10(A) shows a portable telephone 3000, which includes the liquid-crystal display unit 1000 on the upper front surface thereof. FIG. 10(B) shows a wristwatch 4000, which includes the liquid-crystal display unit 1000 on the center front thereof. FIG. 10(C) shows portable information equipment 5000, which includes the liquid-crystal display unit 1000 as a display and an input unit 5100.

Besides the liquid-crystal display unit 1000, these pieces of electronic equipment include a variety of circuits, such as a display information output source, a display information processing circuit, a clock generator circuit, and a display signal generator unit including a power source circuit for supplying these circuits with power. The display presents a video image in the portable information equipment 5000, when it is supplied with the video signal generated by the display signal generator in response to information from the input unit 5100.

Electronic equipment which incorporates the liquid-crystal display unit of the present invention is not limited to the portable telephone, the wristwatch, and the portable information equipment, and may be any of diversity of electronic equipment, such as electronic pocketbook, pager, POS terminal, IC card, mini disc player, liquid-crystal projector, multi-media grade personal computer (PC), engineering workstation (EWS), notebook type personal computer, wordprocessor, television, viewfinder type or direct-monitor viewing type video tape recorder, electronic pocketbook, electronic tabletop calculator, car navigation system, apparatus having a touch panel, and clock.

From the standpoint of driving method, the liquid-crystal display panel employed may be a passive matrix display panel or a static driving liquid-crystal display panel with no switching device incorporated therewithin, or an active matrix addressing liquid-crystal display panel with a three-terminal switching device, represented by a TFT or a two-terminal switching device represented by TFD, and from the standpoint of electrooptical characteristics, a diversity of liquid-crystal display panels may be employed including the one of a TN type, STN type, a guest-host type, a phase-change type, or a ferroelectric type.

What is claimed is:

1. A method for manufacturing a side-lighting surface light source device comprising a light source,
   a reflector member, for reflecting a light ray from the light source, comprising opposed first and second end portions,
   a light guide plate member, and
   a fixing member comprising a fixing body having a support surface, a reflector holder for holding the reflector member, and a lug portion integral with the reflector holder,
   the method comprising:
   arranging the light guide plate member at a predetermined position on the support surface of the fixing member,
   mounting the reflector member, having the light source installed therewithin, at a predetermined position in the reflector holder of the fixing member, and
   bending the lug portion into contact with the reflector member so that the reflector holder and the lug portion secure the reflector member in a clamped state therebetween.

2. A method for manufacturing a side-lighting surface light source device according to claim 1, wherein the light guide plate member is secured by the support surface of the fixing member and the first end portion of the reflector member.

3. A method for manufacturing a side-lighting surface light source device according to claim 1, wherein the fixing member comprises a fixing body formed of a planar member, a reflector holder integrally formed with the fixing body, and a lug portion that projects out of the reflector holder.

4. A method for manufacturing a side-lighting surface light source device according to claim 3, wherein, subsequent to the step (b), the lug portion of the fixing member is bent, thereby securing the reflector member in a clamped state between the reflector holder and the lug portion of the fixing member.

5. A method for manufacturing a side-lighting surface light source device according to claim 1, wherein at least the light guide plate member is secured in a clamped state between the fixing body of the fixing member and the first end portion of the reflector member.

6. A method for manufacturing a side-lighting surface light source device according to claim 5, wherein one member is secured along with the light guide plate member in a clamped state between the fixing body of the fixing member and the first end portion of the reflector member.

7. A method for manufacturing a side-lighting surface light source device according to claim 6, wherein the one member is a reflective sheet arranged on the surface of the light guide plate member opposite to the light exiting surface thereof.

8. A method for manufacturing a side-lighting surface light source device according to claim 6, wherein the one member is an optical sheet arranged above the light exiting surface of the light guide plate member.

9. A method for manufacturing a side-lighting surface light source device according to claim 8, wherein the optical sheet is at least one selected from a prism sheet, a diffusion sheet, and a reflective-type polarizer film.

10. A method for manufacturing a side-lighting surface light source device according to claim 6, wherein the one member is an electrooptical display unit arranged above the light exiting surface of the light guide plate member.

11. A method for manufacturing a side-lighting surface light source device according to claim 10, wherein the electrooptical display unit is a liquid-crystal display panel.

12. A method for manufacturing a side-lighting surface light source device according to claim 1, wherein the fixing member and the reflector member are metallic.

13. An electrooptical apparatus comprising a side-lighting surface light source device according to claim 1.

14. An electrooptical apparatus according to claim 13, wherein the electrooptical display unit is arranged at least on the light emitting surface side of the light guide plate member of the side-lighting surface light source device.

15. An electrooptical apparatus according to claim 14, wherein the electrooptical display unit is a liquid-crystal display panel.

16. Electronic equipment comprising an electrooptical apparatus according to claim 13.

17. A side-lighting type surface light source device comprising:
a light source;
a light guide plate member having an end positioned to receive light rays from the light source and a light exiting surface that allows the incident light rays to exit in a direction;
a reflector member for reflecting a light ray from the light source, the reflector member including opposed first and second end portions extending in substantially the same direction, the first end portion extends to a greater distance than the second end portion, the reflector member directly or indirectly supports the light guide plate member on the first end portion, the second end portion of the reflector member is spaced apart from the light guide plate member;
a fixing member including:
a fixing body having a support surface;
a reflector holder for holding the reflector member, the reflector holder being integral with the fixing body; and
a lug portion integral with the reflector holder, the lug portion being bent toward the reflector member so that the reflector holder and the lug portion secure the reflector member in a clamped state therebetween.

* * * * *